(12) United States Patent
Roys

(10) Patent No.: US 9,415,995 B2
(45) Date of Patent: *Aug. 16, 2016

(54) METHOD AND STRUCTURE FOR PREVENTION OF INCORRECT FUELING OPERATIONS

(71) Applicant: Curtis Alan Roys, Fredericksburg, TX (US)

(72) Inventor: Curtis Alan Roys, Fredericksburg, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/853,778

(22) Filed: Sep. 14, 2015

(65) Prior Publication Data

US 2016/0016784 A1    Jan. 21, 2016

Related U.S. Application Data

(63) Continuation of application No. 14/219,546, filed on Mar. 19, 2014, now Pat. No. 9,133,013, which is a continuation-in-part of application No. 13/153,180, filed on Jun. 3, 2011, now Pat. No. 8,678,049.

(51) Int. Cl.
| | |
|---|---|
| *B65B 1/04* | (2006.01) |
| *B67D 7/32* | (2010.01) |
| *B67D 7/34* | (2010.01) |
| *B67D 7/04* | (2010.01) |
| *B60K 15/04* | (2006.01) |

(52) U.S. Cl.
CPC .............. *B67D 7/3281* (2013.01); *B60K 15/04* (2013.01); *B60K 15/0406* (2013.01); *B67D 7/04* (2013.01); *B67D 7/344* (2013.01); *B60K 2015/0461* (2013.01); *B60K 2015/0483* (2013.01); *B67D 2007/329* (2013.01)

(58) Field of Classification Search
CPC .......................... B67D 7/34; B60K 2015/0483
USPC .............................. 141/1, 94, 96, 350; 285/93
See application file for complete search history.

(56) References Cited

U.S. PATENT DOCUMENTS

| 2,520,935 A | 9/1950 | Hubbell |
| 3,911,977 A | 10/1975 | Berger |

(Continued)

FOREIGN PATENT DOCUMENTS

| EP | 1284212 | 2/2002 |
| EP | 1264726 | 3/2002 |

(Continued)

OTHER PUBLICATIONS http://www.cleanmpg.com/forums/showthread.php?p=182447, last accessed Apr. 21, 2015.

(Continued)

*Primary Examiner* — Jason K Niesz

(74) *Attorney, Agent, or Firm* — Scheinberg & Associates, PC; Michael O. Scheinberg

(57) ABSTRACT

A method and structure are described for preventing the accidental introduction of an incorrect liquid into a tank, such as the introduction of gasoline into the fuel system of a diesel-powered vehicle. In a first embodiment, the entrance to a fill tube of a diesel-powered vehicle is configured with a sensor ring. When an incorrect fueling operation is attempted, such as the introduction of gasoline into the fuel tank of a diesel-powered vehicle, at least one but fewer than all of displaceable mechanical elements are displaced, and the sensor ring alerts the operator visually and/or audibly before fueling starts, thereby preventing incorrect fueling.

22 Claims, 11 Drawing Sheets

(56) References Cited

U.S. PATENT DOCUMENTS

| | | |
|---|---|---|
| 4,195,673 A | 4/1980 | Johnston et al. |
| 5,156,198 A | 10/1992 | Hall |
| 5,249,612 A | 10/1993 | Parks et al. |
| 5,605,182 A | 2/1997 | Oberrecht et al. |
| 5,857,501 A | 1/1999 | Kelerich et al. |
| 6,116,298 A | 9/2000 | Haimovich et al. |
| 6,302,169 B1 | 10/2001 | Pulos |
| 6,374,868 B1 | 4/2002 | Channing |
| 6,382,270 B1 | 5/2002 | Gzik |
| 6,607,014 B2 | 8/2003 | Webb |
| 6,648,033 B2 | 11/2003 | Gabbey et al. |
| 6,712,102 B2 | 3/2004 | Zerangue, Sr. |
| 6,871,677 B2 | 3/2005 | Zerangue, Sr. |
| 6,923,226 B2 | 8/2005 | Bartlett |
| 7,051,772 B2 | 5/2006 | Dillon |
| 7,464,736 B2 | 12/2008 | Jones et al. |
| 7,621,303 B2 | 11/2009 | Buchgraber |
| 7,644,740 B2 | 1/2010 | Benjey et al. |
| 7,661,550 B2 | 2/2010 | Feichtinger |
| 7,841,357 B2 | 11/2010 | Rankin |
| 8,678,049 B2 | 3/2014 | Roys et al. |
| 9,133,013 B2 * | 9/2015 | Roys .................... B67D 7/344 |
| 2008/0236685 A1 | 10/2008 | Nourdine et al. |
| 2008/0302442 A1 | 12/2008 | Miceli |
| 2011/0132906 A1 | 6/2011 | Miller et al. |
| 2011/0315682 A1 | 12/2011 | Tsiberidis |
| 2012/0305127 A1 | 12/2012 | Roys et al. |
| 2014/0110405 A1 | 4/2014 | Breuer et al. |

FOREIGN PATENT DOCUMENTS

| | | |
|---|---|---|
| EP | 1854653 | 11/2007 |
| JP | 2008168748 | 7/2008 |
| WO | 2008084815 | 7/2008 |

OTHER PUBLICATIONS

Unknown, Scully Oil Delivery Systems—The Original and Ultimate Delivery Efficiency Equipment, Scully Signal Company, <www.nationalpetroleum.net/scully-catalog.pdf>, last accessed Jun. 20, 2014, 34 pages.

Unknown, Bulk Fueling Nozzles, <http://www.nationalpetroleum.net/fuel-truck-and-transport/id17.html>, last accessed Jun. 20, 2014, 14 pages/.

* cited by examiner

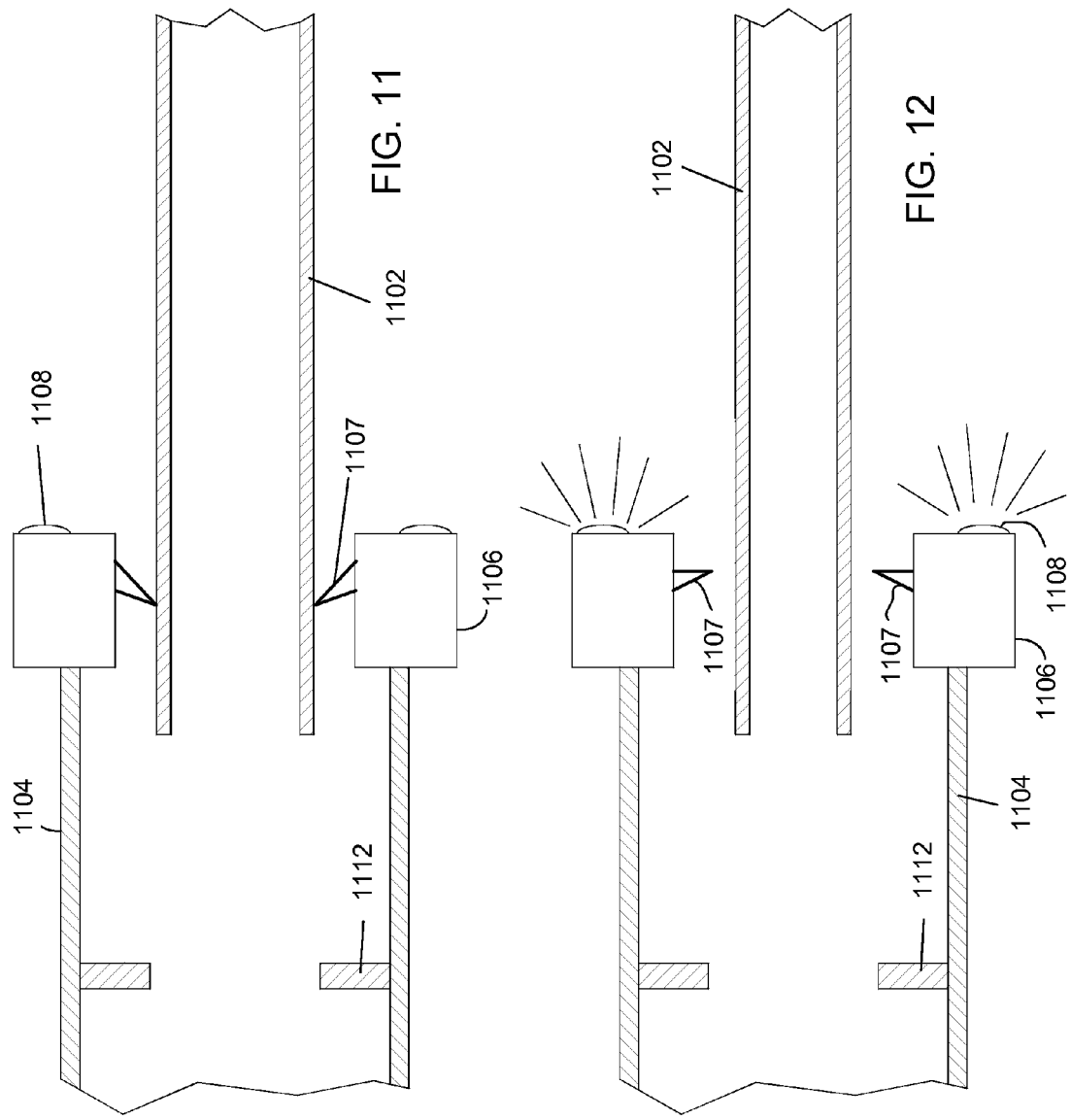

METHOD AND STRUCTURE FOR PREVENTION OF INCORRECT FUELING OPERATIONS

This application is a continuation of U.S. patent Ser. No. 14/219,546, filed Mar. 19, 2014, which is a continuation-in-part of U.S. patent application Ser. No. 13/153,180, filed Jun. 3, 2011, both of which are hereby incorporated by reference.

TECHNICAL FIELD OF THE INVENTION

The present invention relates to vehicles powered by internal combustion engines and in particular to a method and structure for preventing incorrect fueling operations for diesel-powered vehicles.

BACKGROUND OF THE INVENTION

In the past few decades, government limits on the use of leaded fuels have led to the use of smaller gasoline fuel nozzles, designed to fit through "restrictors" in the fill tubes of gasoline-powered vehicles. These restrictors were designed to prevent the introduction of leaded gas into vehicles containing catalytic converters, which would be "poisoned" by the tetraethyl lead contained in older gasoline formulations. Another recent trend has been increasing use of diesel engines to power automobiles and other smaller vehicles, using low-sulfur diesel fuels. As a result, vehicles which an operator might have assumed to require gasoline in the past may now require diesel fuel instead, with correspondingly increased chances of incorrect fueling occurring.

Non-leaded gasoline fill nozzles are approximately 13/16 inch in outer diameter, with gasoline-powered vehicles being configured with restrictors in their gasoline fill tubes having openings corresponding to this size nozzle. Small vehicle diesel fill nozzles are slightly larger, approximately 15/16 inch in diameter, corresponding to the size of the older leaded gas fill nozzles. The restrictors in diesel-powered vehicles must then have openings correspondingly larger to accommodate this slightly larger size fill nozzle.

As a result, the restrictors in gasoline-powered vehicles have openings too small to allow insertion of low-sulfur #2 diesel fuel nozzles (as these nozzles have the same size as the old leaded fuel nozzles, the insertion of which the restrictor was designed to prevent). This situation generally minimizes the chance of accidentally introducing diesel fuel into a gasoline-powered vehicle. Unfortunately, the opposite error of accidentally introducing gasoline into a diesel-powered vehicle is not prevented by the restrictor mechanism, as the smaller gasoline fill nozzle fits easily through the larger opening in the diesel fill tube restrictor. In the past, when diesel power was generally employed only for larger trucks and very few smaller vehicles, this fueling error was less common. With the advent of modern diesel-powered smaller vehicles, such as those employing common-rail direct fuel injection, increasing numbers of smaller vehicles are diesel-powered with the result that fueling errors are now more common.

FIG. 1 is a schematic view 100 of a motor vehicle 106 having an internal combustion engine 104 and a fuel tank 116 connected to the engine 104 by a fuel line 114. A fuel pump 102 supplies fuel to nozzle 112 through tube 110. Nozzle 112 is inserted through fill tube 108 to enable filling of fuel tank 116. Internal combustion engine 104 may be a gasoline engine, in which case fuel pump 102 should be configured to supply gasoline through tube 110 to fuel tank 116 to ensure proper operation of gasoline engine 104. Alternatively, internal combustion engine 104 may be a diesel engine, in which case fuel pump 102 should be configured to supply diesel fuel through tube 110 to fuel tank 116 to ensure proper operation of diesel engine 104. One possible incorrect fueling operation occurs if internal combustion engine 104 is a diesel engine and fuel pump 102 is configured to supply gasoline through tube 110 to nozzle 112. Another possible incorrect fueling operation occurs if internal combustion engine 104 is a gasoline engine and fuel pump 102 is configured to supply diesel fuel through tube 110 to nozzle 112. In either of these two incorrect fueling operations, internal combustion engine 104 would be supplied by the wrong type of fuel through fuel line 114 leading from fuel tank 116, which in both scenarios would contain the wrong type of fuel (i.e., gasoline for the diesel engine, or diesel fuel for the gasoline engine). As described above, diesel fill nozzles are generally configured to be too large in diameter to allow the filling of gasoline fuel tanks with diesel fuel, as the nozzle will not fit through the restrictor hole (see FIG. 12). Conversely, gasoline fill nozzles are small enough in diameter to easily fit into the fill tubes of diesel-powered vehicles.

FIG. 2 is a schematic isometric view 200 of a diesel nozzle 202 entering (directional arrow 216) a diesel fill tube 204 in the prior art. Fill tube 204 comprises an outer tube 206 and an inner tube 208, where outer tube 206 and inner tube 208 are separated by a restrictor 210 with entrance hole 212 configured to fit closely around the outer diameter of diesel nozzle 202.

FIG. 3 is a schematic isometric view 300 of the diesel nozzle 202 of FIG. 2 fitting closely into entrance hole 212 in restrictor 210. A portion 302 of fill tube 202 is shown protruding through entrance hole 212 and into the inner tube 208. In this configuration, diesel nozzle 202 is positioned to supply diesel fuel to the diesel fuel tank (not shown) attached to inner tube 208. FIG. 3 illustrates a correct fueling configuration in which the proper type of fuel (i.e., diesel fuel) may be introduced to a diesel-powered vehicle.

FIG. 4 is a schematic isometric view 400 of a gasoline nozzle 402 entering (directional arrow 416) the diesel fill tube 204 of FIGS. 2 and 3 in the prior art. Note the smaller outer diameter of the gasoline nozzle 402 compared with diesel nozzle 202 in FIGS. 2 and 3. Typical gasoline nozzles have outer diameters of approximately 13/16 inch (approximately 21 mm), while typical #2 low-sulfur diesel nozzles have outer diameters of approximately 15/16 inch (approximately 24 mm).

FIG. 5 is a schematic isometric view 500 of the gasoline nozzle 402 of FIG. 4 fitting loosely into the diesel fill tube 204 of FIGS. 2 and 3 in the prior art. A portion 502 of fill tube 402 is shown protruding through entrance hole 212 and into the inner tube 208. In this configuration, gasoline nozzle 402 is positioned to supply gasoline to the diesel fuel tank (not shown) attached to inner tube 208. FIG. 5 illustrates an incorrect fueling configuration in which the wrong type of fuel (i.e., gasoline) may be introduced to a diesel-powered vehicle. Note that in the prior art there is no physical bar to the insertion of a gasoline nozzle into the diesel fuel tube, thus the incorrect fueling operation illustrated in FIGS. 4 and 5 is possible, and indeed, commonly occurs accidentally. As discussed above, the consequences of supplying gasoline to a diesel internal combustion engine may include serious damage to internal components of the diesel engine arising from premature explosion of the gasoline within the engine cylinders (due to the higher compression ratios compared with gasoline engines), as well as a lack of natural lubrication for engine components (diesel fuel oil is a lubricant, while gasoline is not). Thus it is an object of the present invention to alert individuals who are attempting to refuel a diesel-powered vehicle using gasoline that an incorrect fueling operation is being attempted, before gasoline has been introduced to the diesel fuel tank of the vehicle, thus avoiding costly repairs even in the case where the diesel engine is not actually operating on gasoline (i.e., the gasoline only contaminates the fuel system leading up to the engine).

In response to the need to reduce fueling errors, a number of mechanical methods have been proposed. An early example is illustrated in U.S. Pat. No. 3,911,977, issued Oct. 14, 1975, describing a filler pipe end structure. More recent examples include U.S. Pat. No. 5,249,612, issued Oct. 5, 1993 for an apparatus and method for controlling fluid dispensing employing complex electronic sensing means. Purely mechanical approaches are described in U.S. Pat. No. 6,302,169, issued Oct. 16, 2001, covering a purely mechanical diesel fuel nozzle restrictor. Another purely mechanical device for preventing entry of gasoline into a diesel-powered vehicle is described in U.S. Pat. No. 6,923,226, issued Aug. 2, 2005, and EP1854653, published Nov. 14, 2007.

These approaches require modifications to the gas dispensing system and/or modifications to the gas tank filler neck. This makes wide spread adoption of these solutions difficult, because gas stations are hesitant to modify pumps before a significant number of automobile filler tanks are modified to work with the new nozzles, and automobile manufacturers are hesitant to modify cars until a significant number of gas stations have modified nozzles.

The problem of putting the wrong fuel in a tank is not limited to a consumer filling a tank in his automobile, but can extend to workers filling fuel trucks with an incorrect fuel, or a fuel truck operator putting an incorrect fuel into an underground tank at a gas station or into an above-ground commercial or agricultural tank. For example, a worker could put gasoline in the diesel tanker truck or diesel in the gasoline tanker truck. The incorrect fuel is put into the ground holding tanks at the gas station or convenience store. As a result, hundreds of vehicles would be affected because the owner/operator of the gas pumps doesn't recognize the wrong fuel has been put in his underground storage tanks until a customer has problems and complains.

Thus, there is a twofold problem: How to stop the driver of the tanker trunk from putting the wrong fuel in the underground tanks; and how to eliminate filling the delivery truck with the wrong fuel. The problem is preferably eliminated by stopping the delivery truck from being filled with the wrong fuel at the distribution level.

It is an object of the present invention to configure the diesel fill tube and gasoline fill nozzle to send a warning signal to the person fueling the vehicle that an incorrect fueling operation is being attempted, before any gasoline has been introduced into the diesel fuel tank and without requiring alteration of the filler nozzle or the filler tank neck.

SUMMARY OF THE INVENTION

An object of the invention is to provide a structure and method for preventing the accidental introduction of an incorrect liquid into a tank.

A preferred embodiment provides a device that can be added to a filler neck of a liquid-holding tank to alert a user when an incorrect fuel is about to be added. If a nozzle that is smaller than a specified diameter is inserted, the indicator indicates to a user that an incorrectly-sized filling nozzle is being inserted into the filler neck.

In some embodiments, when a nozzle is inserted through a sensor ring, the nozzle displaces physical contact elements to activate an indicator. The size of the nozzle determines which physical contact elements are displaced. The number of displaced physical contact elements therefore gives an indication of the size of the nozzle inserted into the filler neck and the indicator can indicate if the wrong size nozzle has been inserted. In some embodiments, each of the displaced physical contact elements changes the status of an electric circuit element, and if at least one, but fewer than all of the electric circuit elements change status, than the indicator is activated. In other embodiments, the physical contact elements alter a mechanical key device, and an indicator shows if at least one but fewer than all of the mechanical physical contact elements are displaced.

In some embodiments, the sensor ring is positioned on the filler neck of a tank intended to hold diesel fuel, and the sensor ring alerts the user when the nozzle from a gasoline pump is inserted.

In some embodiments, the sensor ring can be used to prevent the introduction of an incorrect fuel into a tanker truck or into a stationary storage tank, such as an underground tank, in a gas station, commercial fueling station, agricultural fueling station, or heating oil storage.

The foregoing has outlined rather broadly the features and technical advantages of the present invention so that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which:

FIG. 11 shows a nozzle of the correct size inserted into a filler neck;

FIG. 12 shows a nozzle that is undersized inserted into a filler neck;

DETAILED DESCRIPTION OF PREFERRED EMBODIMENTS

Embodiments of the invention can provide one or more advantages over typical prior art fueling systems. Not all embodiments will provide all the benefits. Some embodiments provide a method for sensing an attempted incorrect fueling operation, such as an attempt to introduce gasoline into a fuel tank of a diesel-powered vehicle. Some embodiments of the invention provide a sensor ring for a diesel filler neck tube. The sensor ring preferably can be mounted on the filler neck of an automobile gas tank without any modification to the filler neck or to the gas nozzle. A preferred embodiment provides a sensor ring that can be readily added to an existing vehicle and that requires minimal or no alteration to the fueling facilities. Those embodiments can therefore be purchased by an automobile owner as an after-market product and can be installed by the automobile owner who is not a mechanic.

In some embodiments, the sensing of the nozzle is by displaceable mechanical elements, connected to switches, For example, the introduction of a nozzle displaces mechanical elements, and the movement of those elements causes an electrical or mechanical switch change state, for example, to make or break an electrical contact. In some embodiments, a nozzle that is smaller than a pre-specified diameter will displace fewer than all of the mechanical elements, so that fewer than all of the switches will change state. When at least one of the switches changes state, but fewer than all of the switches change state, an indicator warns the user that an incorrect nozzle has been inserted. In other embodiments, the displaceable mechanical elements cause a keyed mechanical structure to alter, so that when at least one but fewer than all of the mechanical elements are displaced, a mechanical indicator is activated. That is, the switches are mechanical links and the circuit is a mechanical circuit that activates the indicator when at least one of the displaceable mechanical elements is displaced and fewer than all of the displaceable mechanical elements are displaced. The mechanical indicator may, for example, rotate elements having different colors on different surfaces to display a bright red warning surface when activated and a dull surface when not activated.

Figure 1:
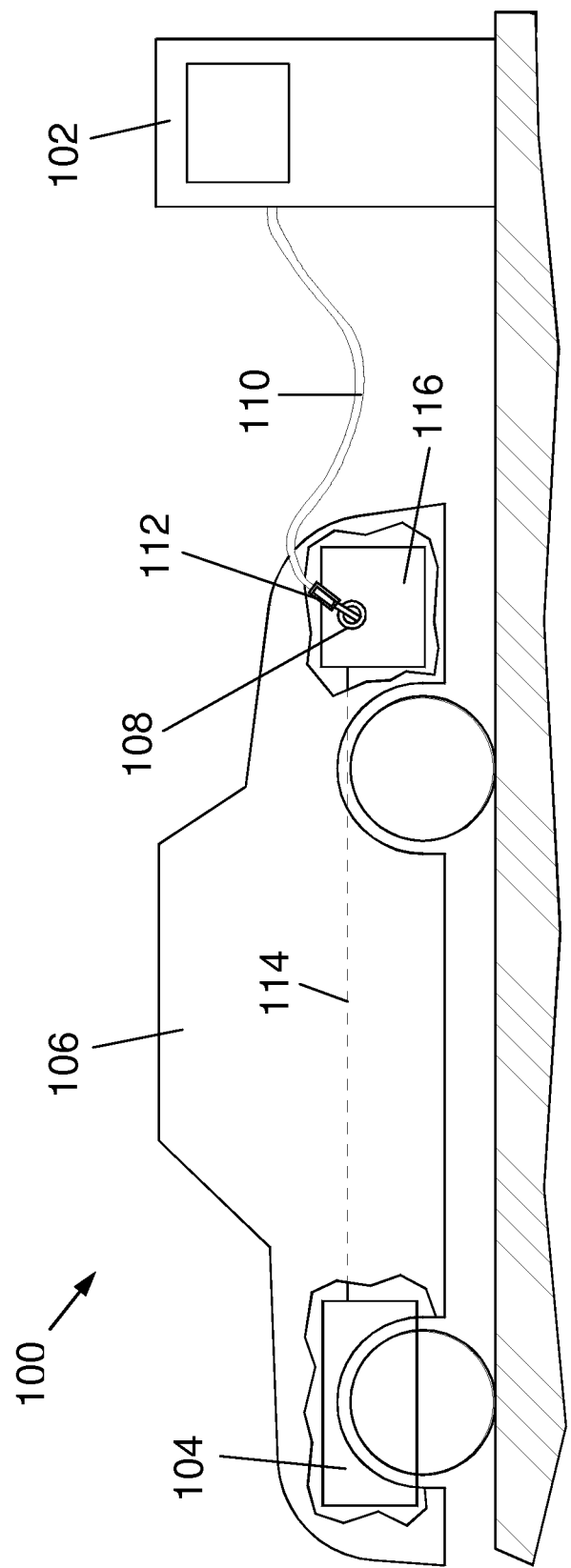
FIG. 1 is a schematic view of a motor vehicle having an internal combustion engine and a fuel tank connected to the internal combustion engine.
Figure 2:
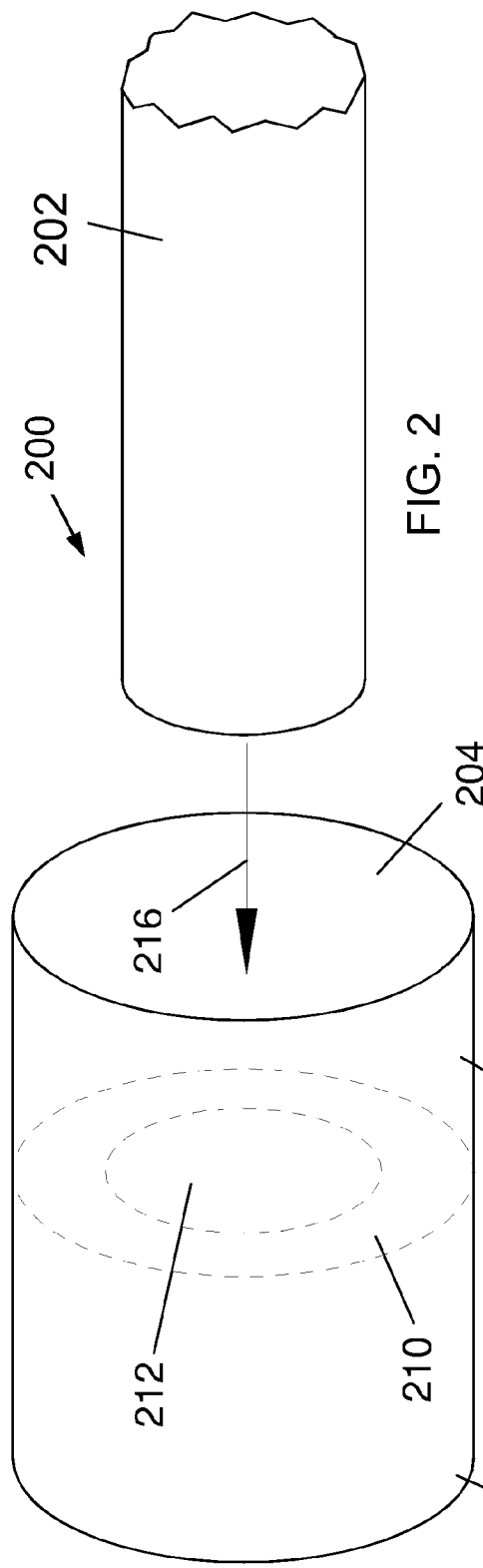
FIG. 2 is a schematic isometric view of a diesel nozzle entering a diesel fill tube in the prior art.
Figure 3:
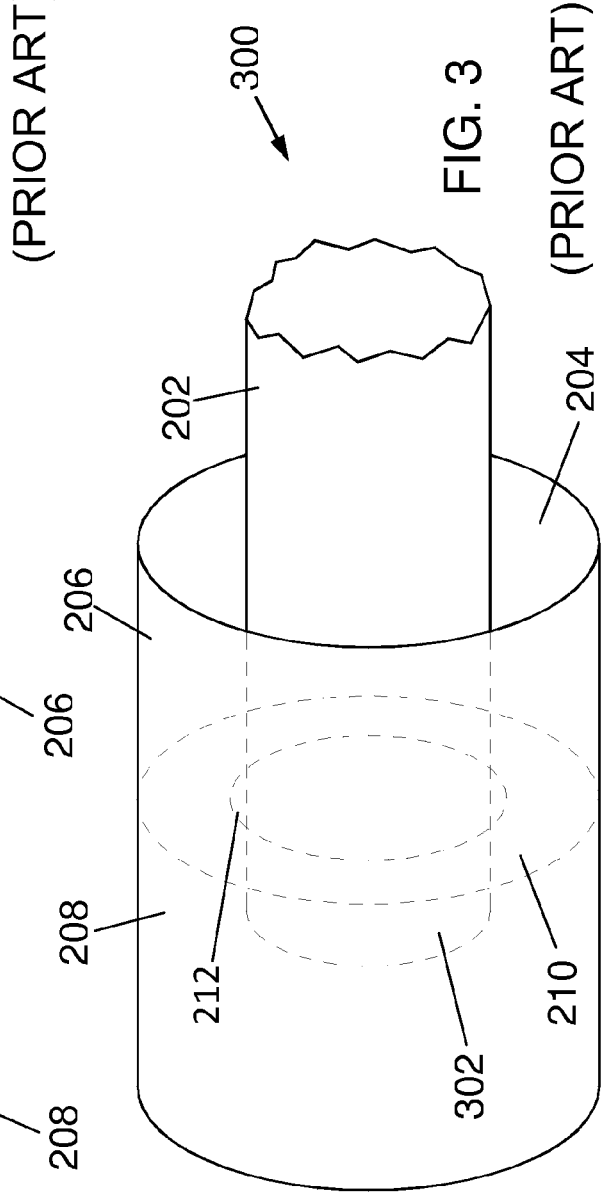
FIG. 3 is a schematic isometric view of the diesel nozzle of FIG. 2 fitting closely into a diesel fill tube in the prior art.
Figure 4:
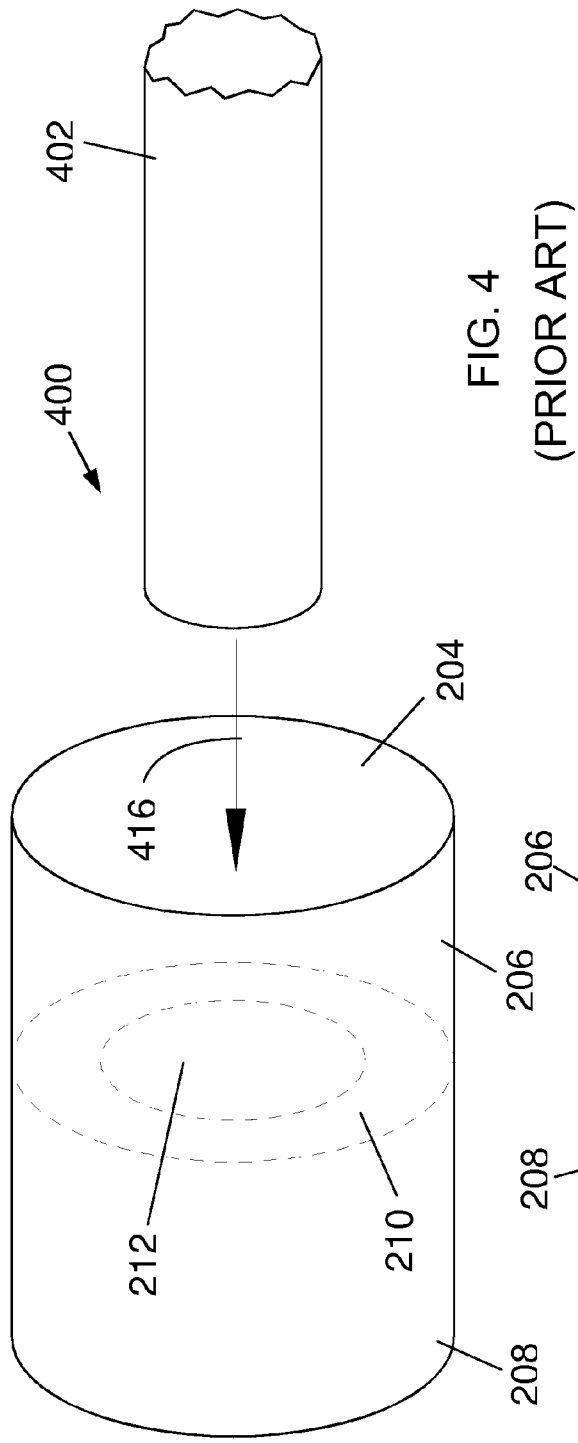
FIG. 4 is a schematic isometric view of a gasoline nozzle entering a diesel fill tube in the prior art.
Figure 5:
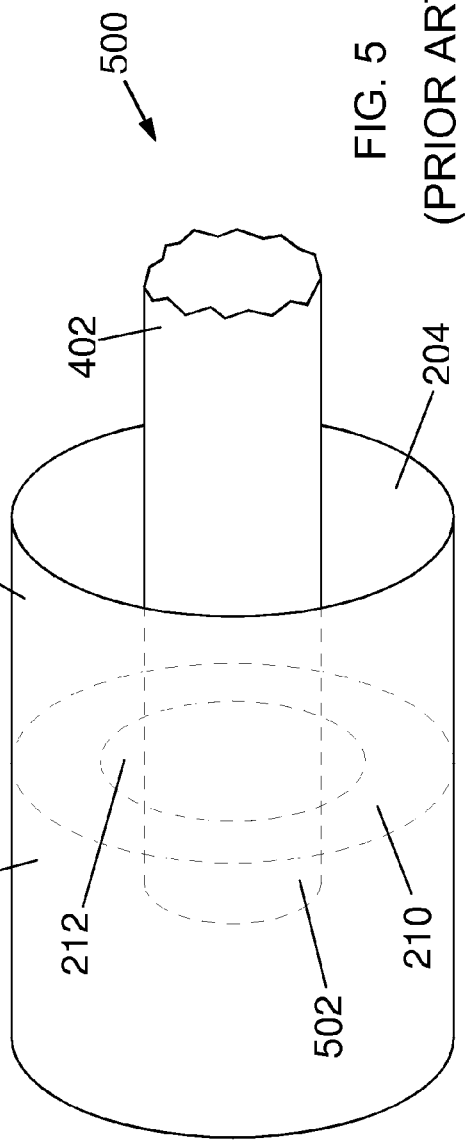
FIG. 5 is a schematic isometric view of the gasoline nozzle of FIG. 4 fitting loosely in a diesel fill tube in the prior art.
Figure 6A:
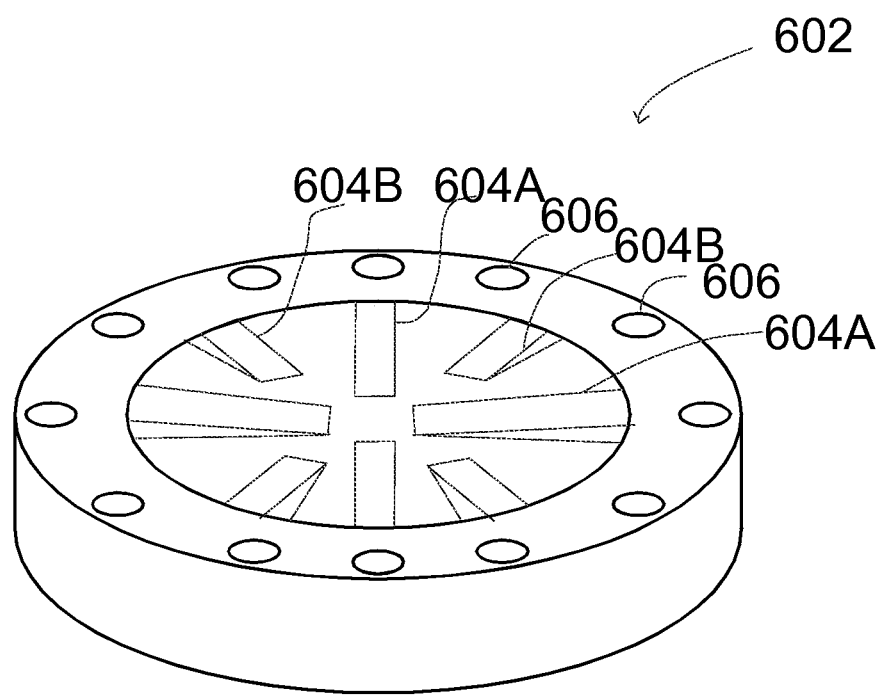
FIG. 6A is a schematic view of an indicator ring.

FIG. 6A shows a ring assembly 602 having eight displaceable mechanical elements 604A and 604B (collectively elements 604) that are displaced when a nozzle is inserted and indicators 606 that alert a user when at least one of the elements 604 is displaced, but fewer than all of the elements 604 are displaced. FIG. 6A shows that the displaceable mechanical elements 604A extend further toward the center of the filler neck than the other four contacts 604B. This ensures that a small nozzle will displace at least one of the displaceable mechanical elements 604, but a small nozzle will fail to displace all of the displaceable mechanical elements 604, particularly the shorter displaceable elements 604B.

Figure 6B:
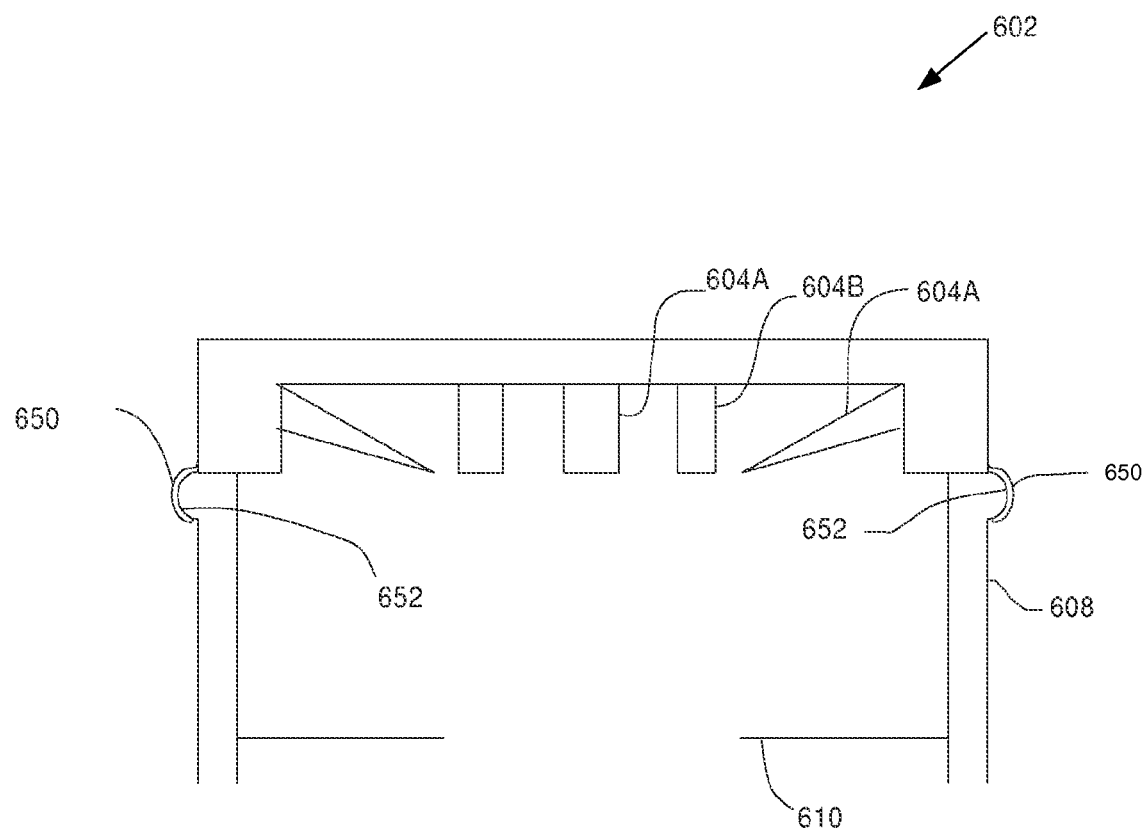
FIG. 6B is a cross-sectional view of the indicator ring of FIG. 6A.

That is, a small nozzle will displace the displaceable mechanical elements that extend further toward the center line of the filler neck, to activate the indicator, but the small nozzle will not displace the displaceable mechanical elements that do not penetrate as far into the filler neck, so the indicator will remain activated. FIG. 6B shows a cross section of the ring assembly attached to a filler neck 608 with the displaceable mechanical elements 604 displaced as they would be by the insertion of a nozzle. Restrictor 610 in filler neck 608 prevents the insertion of a nozzle that is larger than a specified size, while ring 602 alerts a user when inserting a nozzle that is smaller than a specified size.

Ring 602 includes a curved lip 650 that snaps over a bead 652 at the end of filler neck 608. Lip 650 is composed of a springy metal material so that it displace when forced over bead 650, and then lip 650 springs back to securely hold ring 602 to filler neck 608 and automatically centers it. In another embodiment (not shown), a clamp, similar to the well known hose clamp, is used to tighten the ring onto the filler neck. The adjustment mechanism of the clamp is preferably positioned so that it is readily accessible to a user using a screwdriver or a hex wrench. For example, the adjusting screw may be normal to the major plane of the clamp so that the screw head faces toward the opening of the fueling compartment.

Figure 7:
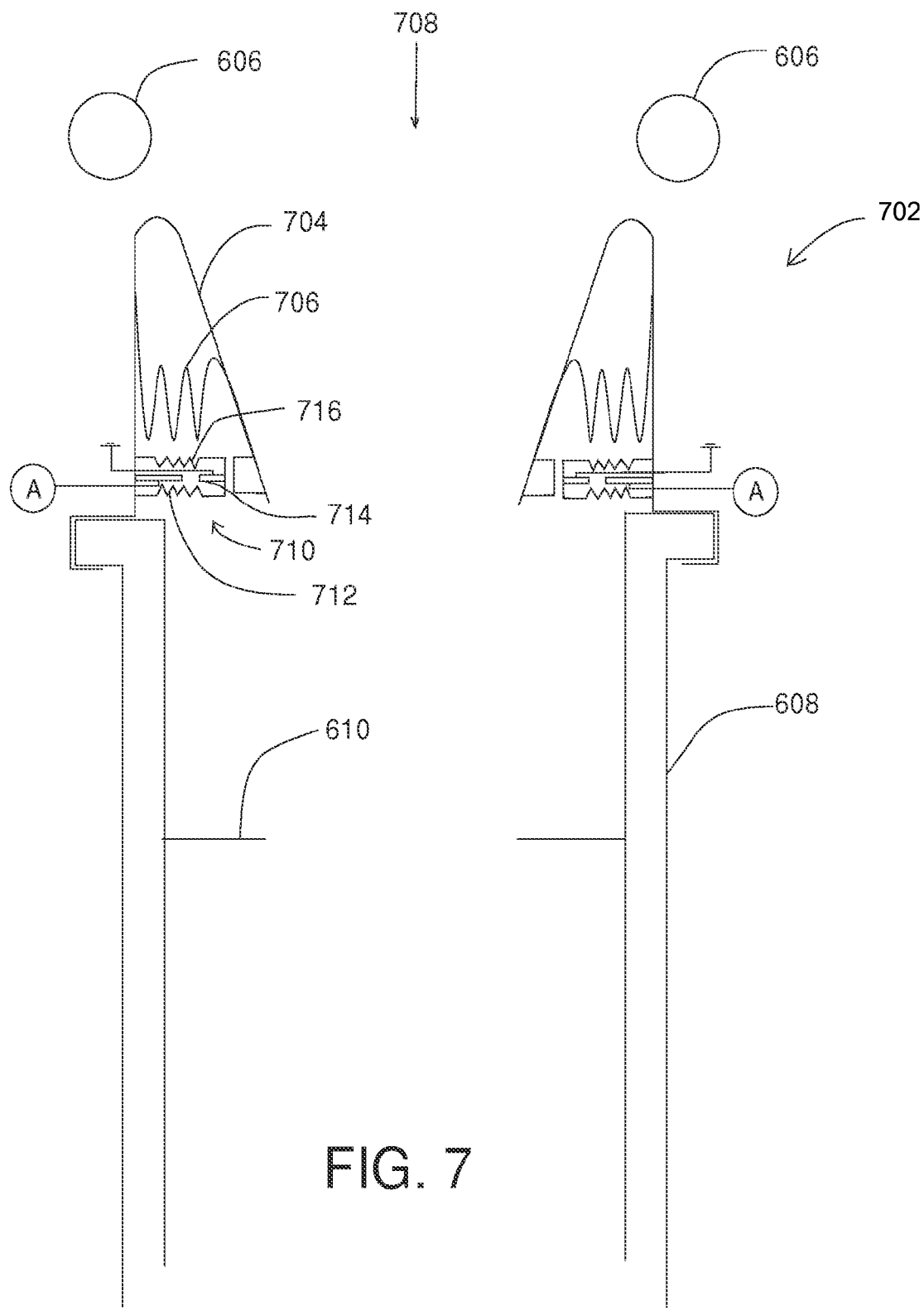
FIG. 7 is a schematic cross-section showing the details of a switch on an indicator ring.

FIG. 7 is a schematic cross section of one embodiment of the invention. A ring assembly 702 includes multiple displaceable mechanical elements 704 (two shown) and is attached to filler neck 608. Each of the multiple displaceable mechanical elements 704 is extended into the nozzle path 708 by a spring 706. A switch 710 includes a first contact 712 and a second contact 714 contained with a bellows 716. Bellows 716 is composed of a springy material that keeps the contact separated and is preferably air tight to keep fumes away from contacts 712 and 714. When a nozzle (not shown) is inserted, element 704 moves against the force of spring 706 to compress bellows 716, bringing first contact 712 and second contact 714 together making electrical contact.

In some embodiments, it is necessary for the switches to avoid creating a spark or heat to avoid risk of explosion. Because diesel fumes are less explosive than gasoline fumes, explosion is less of a risk when the ring is positioned around the neck of a diesel tank. Because a driver may attempt to put a gasoline nozzle into a diesel tank, and because the device is used at a gasoline station, the switches are preferably suitable for use in an explosive environment. There are known methods to eliminate sparks, such as providing an appropriate RLC circuit in the contact circuit.

Figure 8:
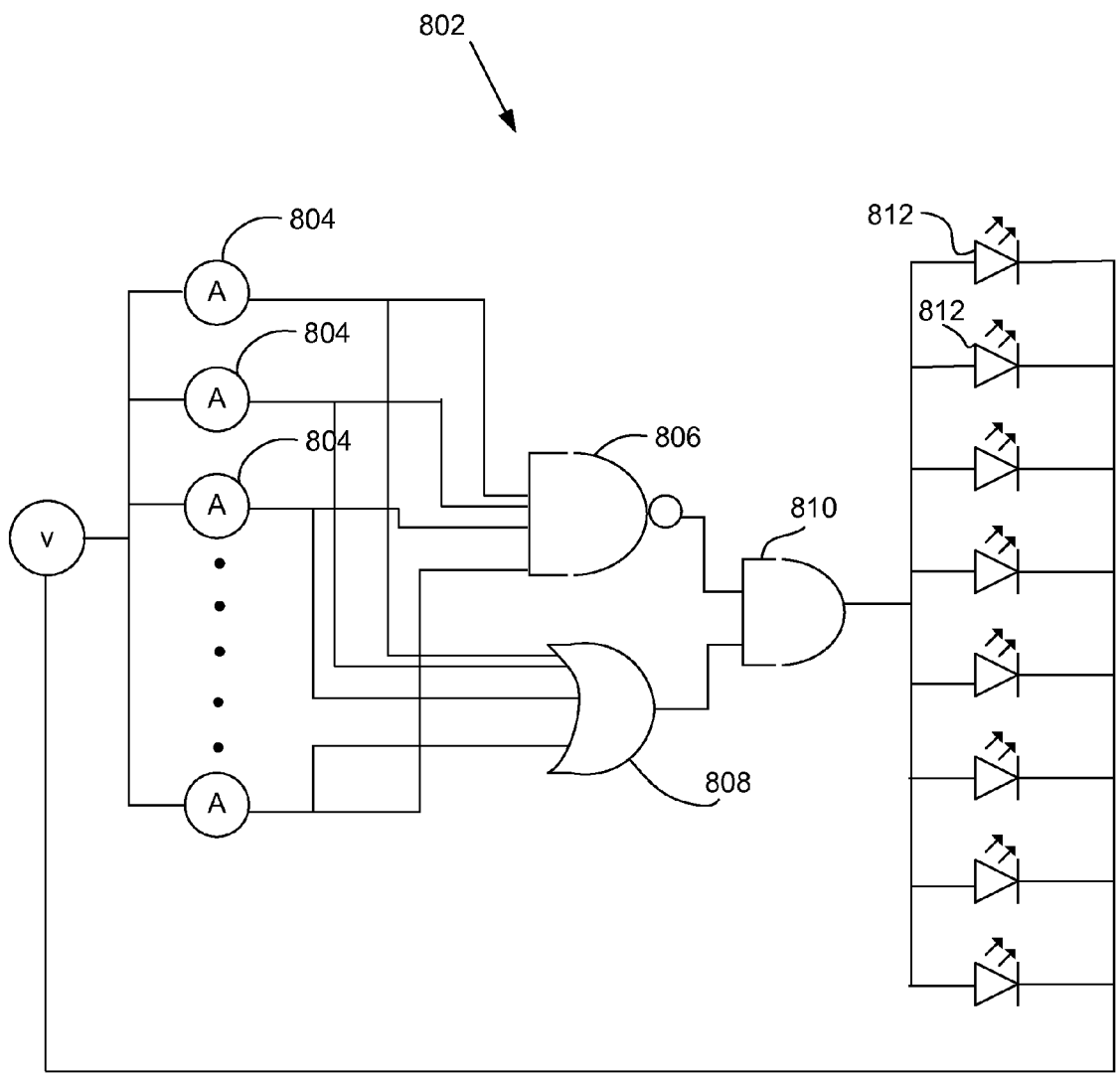
FIG. 8 shows a schematic of the logic circuit of the invention.

FIG. 8 is a logic diagram 802 showing the inputs from switches 710 in the ring 602. The inputs 804 from all the switches are used as inputs to a NAND gate 806 and OR gate 808. That is, if all the switches 710 make contact and all the inputs 804 are ON, the output of the NAND gate is negative. The output of NAND gate 806 will therefore only be OFF when all the switches are on so that when a nozzle of the appropriate size displaces all the elements 604, NAND gate will be OFF.

The inputs from all the switches are also used as inputs into an OR gate 808 so that if at least one of the switches is activated, the output of OR gate 808 is ON. The outputs of NAND fate 806 and OR gate 808 are used as inputs to AND gate 810, whose output will be ON only when at least one, but fewer than all, of the mechanical contact elements 604 are displaced. When the output of AND gate 810 is ON, LEDs 812 or other indicator will be activated. If either none of the switches is activated, for example, because there is no nozzle within the collar, or all of the LEDs are activated, because a nozzle having a sufficiently large diameter is inserted, then the LEDs will not be illuminated. If, for example, a small nozzle is inserted into the ring, then fewer than all of the switches will be activated and the LEDs will illuminate.

The logic gates can be programmed into a programmable logic array positioned on a small circuit board, along with a small battery, and attached to the ring. Part or all of the circuitry can be encapsulated in a protective material. In one embodiment, a flexible circuit board provides connections to all the switches, to the LEDs, to the logic circuit, and to the battery.

Figure 9:
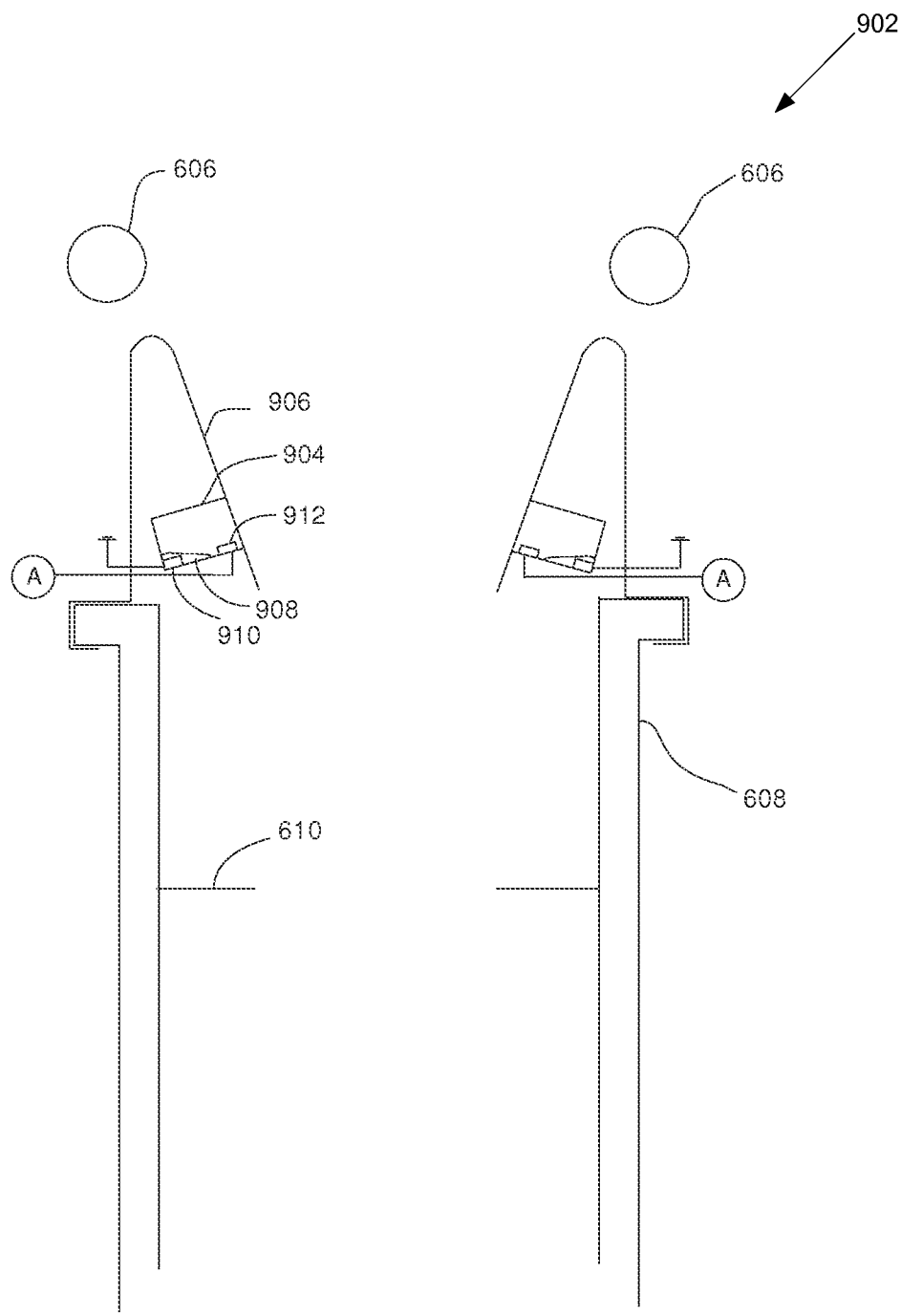
FIG. 9 is a schematic cross-section showing the details of another embodiment of a switch on an indicator ring.

FIG. 9 shows schematically another embodiment of a ring 902 that is similar to that of FIG. 7, but the embodiment of FIG. 9 uses mercury switches 904. As a nozzle (not shown) is inserted, element 906 is displaced, changing the angle of the floor of switch 904 and causing the mercury 908 to flow and electrically connect first contact 910 and second contact 912.

Figure 10:
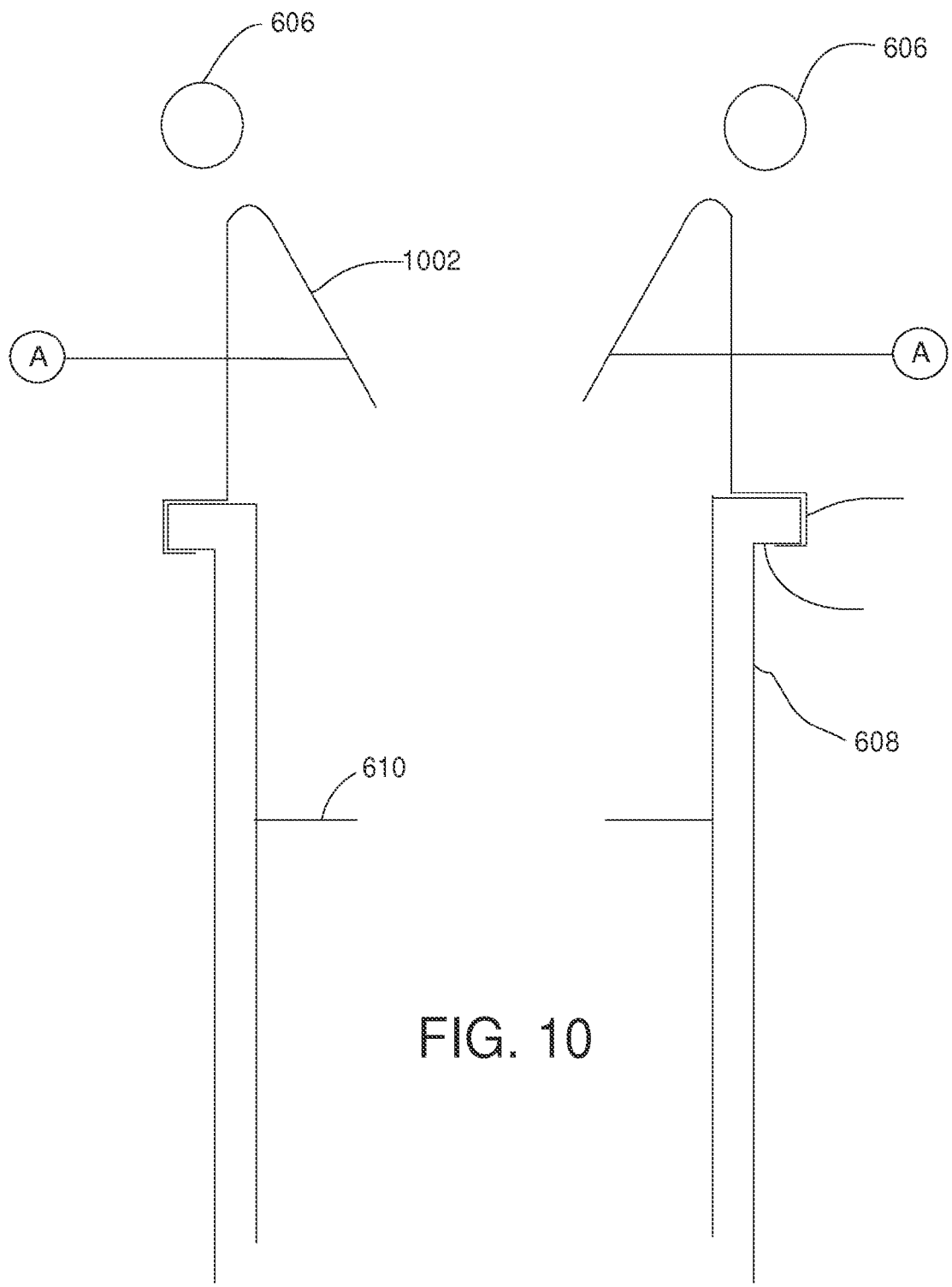
FIG. 10 is a schematic cross-section showing the details of yet another embodiment of a switch on an indicator ring.

FIG. 10 shows another embodiment of the invention, in which a displaceable mechanical elements 1002 provides the electrical contact. A nozzle in a gasoline pump is grounded. When the nozzle is inserted, it electrically grounds the element 1002, completing the circuit.

In any of the embodiments, sparks can be reduced or eliminated by the use of low voltage DC contacts and the use of an appropriate "spark quencher" circuit having appropriate inductance and capacitance to dissipate any energy slowly to avoid a spark.

FIG. 11 shows a nozzle 1102 of the correct size being inserted into the filler neck 1104 to which a sensor ring 1106 with displaceable mechanical elements 1107 is attached. Because the nozzle 1102 displaces all of the displaceable mechanical elements 1107 of the sensor ring 1106, indicators 1108 are not lit up. FIG. 12 shows a nozzle 1202 having a diameter smaller than the proper diameter for the type of fuel required. FIG. 12 shows that the nozzle 1202 fails to displace all of the displaceable mechanical elements 1204, and therefore at least one but less than all the electrical contacts change state, and so indicators 1108 are activated.

Figure 13:
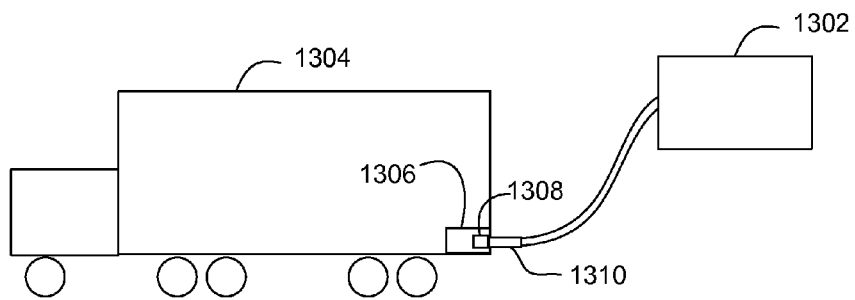
FIG. 13 shows schematically an embodiment of the present invention used to prevent introduction of an incorrect fuel into a tanker truck.

While the embodiments described are used to prevent introduction of gasoline into the tank of a diesel automobile, the invention is not limited to any particular type of tank or any particular type of liquid being pumped. For example, FIG. 13 shows schematically the use of an embodiment of the invention to prevent the introduction of an incorrect fuel from a supply tank 1302 at a fuel storage facility into a tanker truck 1304. A fuel inlet 1306 on the truck includes an insert 1308 embodying the invention to prevent a nozzle 1310 from being inserted into a fuel truck if the fuel in tank 1302 is not the type of fuel intended to be introduced into fuel truck 1304. Of course, the type of nozzle 1310 at the storage facility will typically be of a different design from the nozzle at a retail gas station, so the design of the insert 1308 at the filler inlet 1306 of the tanker truck 1304 will be modified accordingly.

Figure 14:
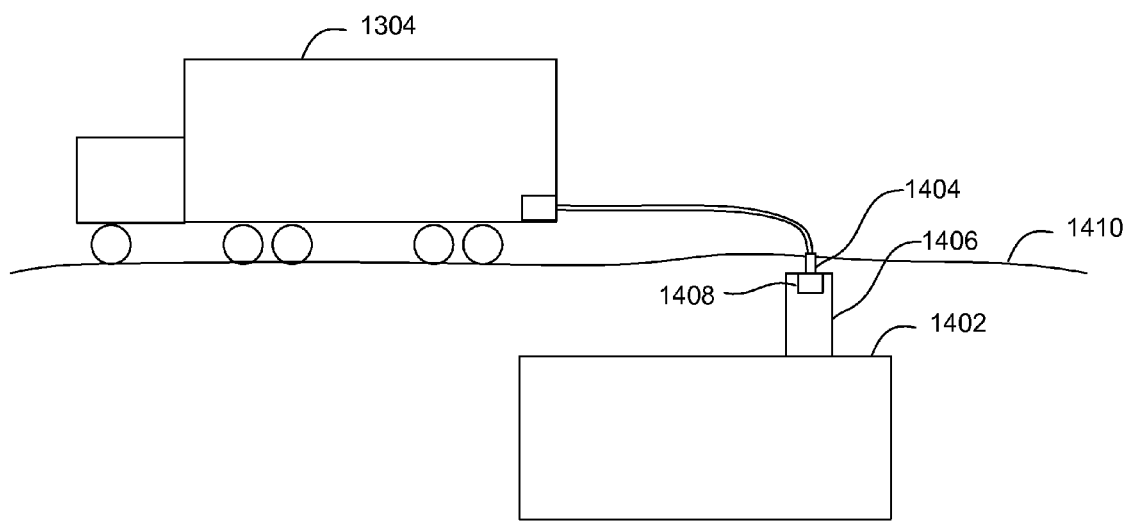
FIG. 14 shows schematically an embodiment of the present invention used to prevent introduction of an incorrect fuel into an underground gas tank.

FIG. 14 shows schematically the use of an embodiment of the invention to prevent the introduction of an incorrect fuel from a tanker truck 1304 into an underground or other storage tank 1402 at a gas station, commercial fueling station, agricultural fueling station, or heating oil storage. Tanker truck 1304 dispenses fuel though nozzle 1404 into an inlet 1406 of underground tank 1402. An insert 1408 in accordance with the present invention in the inlet 1406 prevents introduction of an incorrect fuel into the tank 1402. While tank 1402 is shown under ground level 1410, tank 1402 could also be above ground. Of course, the type of nozzle 1404 used by tanker will be different from the nozzle used to fill cars at a retail gas station, so the design of the insert 1408 at the filler inlet 1406 of the tank will be modified accordingly.

The embodiments shown use LED indicators, but other visible or audible indicators can be used. The embodiments shown use electrical switches, but embodiments that use mechanical means that change a mechanical indicator can be used. For example, the displaceable mechanical elements can connect to a spring biased elements having a bright color on one side and a dull color on the other side, the elements being connected in such a way that when fewer than all the displaceable mechanical elements are displaced, the display elements flip to show the bright color as a warning that an incorrect nozzle is being inserted.

"Switch" can be an electrical switch that, for example, makes and breaks contacts, or a mechanical switch that changes state or position. A logic circuit can also be electrical, electronic, or mechanical. A mechanical logic circuit changes the state of the indicator depending on the states of the mechanical switches.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

I claim as follows:

1. An apparatus for alerting a refueler to the attempted introduction of an incorrect liquid into a tank for storing the liquid, the tank having a filler neck through which the liquid enters the tank, comprising:
    a ring having a diameter suitable for being disposed around the filler neck of a tank;
    multiple displaceable mechanical elements disposed around the ring such that the physical elements are displaced when a nozzle is introduced into the filler neck;
    one or more indicators to indicate to a user when a nozzle having a diameter smaller than a specified value is inserted
    the indicator being activated when at least one of the displaceable mechanical elements is displaced and fewer than all of the displaceable mechanical elements are displaced.

2. The apparatus of claim 1 in which the indicator indicates to a user when an automobile unleaded gasoline nozzle is inserted through the ring.

3. The apparatus of claim 2 in which the indicator indicates to a user when an automotive diesel nozzle is inserted through the ring.

4. The apparatus of claim 1 in which the indicator indicates to a user when a nozzle having an outer diameter of $13/16$ inch is inserted through the ring.

5. The apparatus of claim 3 in which the indicator indicates to a user when a nozzle having an outer diameter of $15/16$ inch is inserted through the ring.

6. The apparatus of claim 1 in which the indicator comprises an audible or visual alarm.

7. The apparatus of claim 1 in which the ring includes a base that attaches to a filler neck.

8. The apparatus of claim 1 further comprising:
    multiple mechanical switches associated with the multiple displaceable mechanical elements; and
    a mechanical circuit that activates the indicator when at least one of the displaceable mechanical elements is displaced and fewer than all of the displaceable mechanical elements are displaced.

9. A method of preventing the accidental introduction of gasoline into the fuel tank of a vehicle having a diesel engine, comprising:
providing a ring on a filler neck of a tank;
inserting a nozzle through the filler neck, the nozzle displacing displaceable mechanical elements;
if the nozzle displaces at least one but fewer than all of the displaceable mechanical elements, providing a signal to a user that a nozzle of an incorrect size is being inserted into the filler neck.

10. The method of claim 9 in which providing a signal to a user that a nozzle of an incorrect size is being inserted into the filler neck comprises illuminating a light emitting diode.

11. A fuel system, comprising:
a fuel tank having a filler neck for providing fuel;
an apparatus in accordance with claim 1 for alerting a refueler to the attempted introduction of an incorrect liquid into the fuel tank.

12. The fuel system of claim 11 in which the fuel tank is an automotive diesel fuel tank.

13. The fuel system of claim 11 in which the fuel tank is mounted on a tanker truck.

14. The fuel system of claim 11 in which the fuel tank is an underground or above ground stationary fuel tank.

15. The apparatus of claim 1 in which the one or more indicators include different colors on different surfaces, one color being displayed to indicate when at least one of the displaceable mechanical elements is displaced and fewer than all of the displaceable mechanical elements are displaced.

16. The apparatus of claim 1 in which the apparatus is configured to attach to an automobile as an aftermarket product.

17. The apparatus of claim 1 in which the apparatus is configured to attach to an automobile with no alternation of the filler neck.

18. The apparatus of claim 1 in which the multiple displaceable mechanical elements provide input to a mechanical logic circuit.

19. The method of claim 9 in which providing a signal to a user that a nozzle of an incorrect size is being inserted into the filler neck comprises displaying a surface having a first color and if the nozzle displaces all the displaceable mechanical elements, displaying a surface having a second color.

20. The method of claim 9 in which providing a signal to a user that a nozzle of an incorrect size is being inserted into the filler neck comprises providing a signal to a user when automobile unleaded gasoline nozzle is inserted through the ring.

21. The method of claim 9 in which providing a signal to a user that a nozzle of an incorrect size is being inserted into the filler neck comprises providing a signal to a user when a nozzle having an outer diameter of $13/16$ inch is inserted through the ring.

22. The method of claim 9 in which providing a ring on a filler neck of a tank comprising attaching the ring to the unmodified filter neck of a fuel tank of a diesel-fueled automobile.

* * * * *